(12) United States Patent
Nas et al.

(10) Patent No.: US 8,626,157 B2
(45) Date of Patent: Jan. 7, 2014

(54) METHODS, SYSTEMS, AND COMPUTER READABLE MEDIA FOR DYNAMIC SUBSCRIBER PROFILE ADAPTATION

(75) Inventors: Petrus Wilhelmus Adrianus Jacobus Maria Nas, Gravenhage (NL); Thomas M. McCann, Raleigh, NC (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 77 days.

(21) Appl. No.: 13/021,402

(22) Filed: Feb. 4, 2011

(65) Prior Publication Data

US 2011/0195710 A1    Aug. 11, 2011

Related U.S. Application Data

(60) Provisional application No. 61/303,652, filed on Feb. 11, 2010, provisional application No. 61/374,240, filed on Aug. 16, 2010.

(51) Int. Cl.
*H04W 4/00* (2009.01)

(52) U.S. Cl.
USPC ........ 455/432.3; 455/450; 370/328; 370/335; 370/338

(58) Field of Classification Search
USPC ................ 455/432.3, 450; 370/338–335, 328
See application file for complete search history.

(56) References Cited

U.S. PATENT DOCUMENTS

| 2003/0227894 A1* | 12/2003 | Wang et al. .................... 370/338 |
| 2005/0235000 A1 | 10/2005 | Keil |
| 2006/0259759 A1 | 11/2006 | Maino et al. |
| 2009/0080440 A1 | 3/2009 | Balyan et al. |
| 2009/0313379 A1 | 12/2009 | Rydnell et al. |
| 2011/0165901 A1 | 7/2011 | Baniel et al. |
| 2011/0302244 A1 | 12/2011 | McCann et al. |
| 2012/0226814 A1 | 9/2012 | Stucker |
| 2013/0151845 A1 | 6/2013 | Donovan |

FOREIGN PATENT DOCUMENTS

| EP | 1 873 980 A1 | 1/2008 |
| WO | WO 2011/156274 A2 | 12/2011 |

OTHER PUBLICATIONS

3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).

(Continued)

*Primary Examiner* — Ajit Patel
*Assistant Examiner* — Julio Perez
(74) *Attorney, Agent, or Firm* — Jenkins, Wilson, Taylor & Hunt, P.A.

(57) ABSTRACT

The subject matter described herein includes methods, systems, and computer readable media for dynamic subscriber profile adaptation. According to one aspect of the subject matter described herein, a method for subscriber profile adaptation is provided. The method includes receiving, from a database that stores subscriber profile information, a message generated by the database node in response to a message received by the database node. The message generated by the database node may include subscriber profile information. The method further includes determining whether to modify the subscriber profile information based on predetermined criteria. The method further includes, in response to determining to modify the subscriber profile information, modifying the subscriber profile information and forwarding the modified information to an originator of the message generated by the database node.

23 Claims, 14 Drawing Sheets

(56) References Cited

OTHER PUBLICATIONS

Notification of Transmittal of the International Search Report and the Written Opinion of the International Searching Authority, or the Declaration for International Application No. PCT/US2011/023752 (Oct. 26, 2011).
Non-Final Office Action for U.S. Appl. No. 13/154,119 (May 2, 2013).
Communication of European publication number and information on the application of Article 67(3) EPC for European Patent Application No. 11792956.2 (Mar. 13, 2013).
Notification of Transmittal of the International Search Report and the Written Opinion of the International Searching Authority, or the Declaration for International Application No. PCT/US2011/039285 (Feb. 9, 2012).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272 V10.2.0, pp. 1-95 (Mar. 2011).
Rouse, "Platform," http://searchservervirtualization.techtarget.com/definition/platform, pp. 1-2 (2006-2009).
Calhoun et al., "Diameter Base Protocol," RFC 3588, pp. 1-147 (Sep. 2003).
Calhoun et al., "Diameter Base Protocol,"draft-ietf-aaa-diameter-07, Section 6.3, p. 68 (Jul. 2001).

* cited by examiner

METHODS, SYSTEMS, AND COMPUTER READABLE MEDIA FOR DYNAMIC SUBSCRIBER PROFILE ADAPTATION

PRIORITY CLAIM

This application claims the benefit of U.S. Provisional Patent Application Ser. No. 61/303,652, filed Feb. 11, 2010, and U.S. Provisional Patent Application Ser. No. 61/374,240, filed Aug. 16, 2010; the disclosures of which are incorporated herein by reference in their entireties.

TECHNICAL FIELD

The subject matter described herein relates to subscriber profile adaptation. More particularly, the subject matter described herein relates to methods, systems, and computer readable media for dynamic subscriber profile adaptation.

BACKGROUND

In mobile communications networks, network nodes, such as home location registers (HLRs), home subscriber servers (HSSs), and electronic number mapping (ENUM) servers store subscriber profile information. Such information may include details about a subscriber's service, such as features that are part of the subscriber's service plan. Examples of such features may include data network bandwidth, advanced calling features, such as conference calling, call waiting, call forwarding, etc. Network operators may desire to selectively control access to this information depending on who is requesting the information. For example, a network operator may wish to selectively control access to subscriber profile information depending on the network in which a subscriber is roaming.

Accordingly, in light of these needs, there exists a need for methods, systems, and computer readable media for dynamic subscriber profile adaptation.

SUMMARY

The subject matter described herein includes methods, systems, and computer readable media for dynamic subscriber profile adaptation. According to one aspect of the subject matter described herein, a method for subscriber profile adaptation is provided. The method includes receiving, from a database node that stores subscriber profile information, a message generated by the database node in response to a message received by the database node. The message generated by the database node may include subscriber profile information. The method further includes determining whether to modify the subscriber profile information based on predetermined criteria. The method further includes, in response to determining to modify the subscriber profile information, modifying the subscriber profile information and forwarding the modified information to an originator of the message received by the database node.

According to another aspect of the subject matter described herein, a method for dynamic subscriber profile adaptation at a database node is provided. The method includes receiving a message for which a response including subscriber profile information is indicated. The method further includes identifying a set of subscriber profile information provisioned for the subscriber to which the message pertains. The method further includes determining whether to modify the set subscriber profile information for inclusion in a message generated in response to the received message based on predetermined criteria. The method further includes, in response to determining to modify the set of subscriber profile information for inclusion in the generated message, modifying the set subscriber profile information to be included in the generated message and forwarding the generated message to an originator of the received message.

According to another aspect of the subject matter described herein, a subscriber profile adaptation platform is provided. The subscriber profile adaptation platform includes a network interface for receiving, from a database that stores subscriber profile information, a message generated by the database node in response to a message received by the database node. The message generated by the database node includes subscriber profile information. The platform further includes a profile adaptation manager for determining whether to modify subscriber profile information provided to an originator of the received message based on predetermined criteria. In response to determining to modify the subscriber profile information, the profile adaptation manager modifies the subscriber profile information and forwards the modified subscriber profile information to the originator.

According to another aspect of the subject matter described herein, a subscriber profile adaptation platform that modifies subscriber profile information is provided. The platform includes a network interface for receiving a message. The platform further includes a profile adaptation manager for identifying a set of subscriber profile information stored by the platform for the subscriber to which the received message pertains, for determining whether to modify the set subscriber profile information for inclusion in a message generated in response to the received message based on predetermined criteria, and for, in response to determining to modify the set of subscriber profile information to be provided to an originator of the received message, modifying the set subscriber profile information and forwarding the modified information to the originator of the received message.

As used herein, the terms "network node" or "platform" each refer to a computing platform including one or more processors and associated memory.

The subject matter described herein for dynamic subscriber profile adaptation can be implemented in software in combination with hardware and/or firmware. In one exemplary implementation, the subject matter described herein can be implemented using a non-transitory computer readable medium having stored thereon executable instructions that when executed by the processor of the computer control the computer to perform steps. Exemplary computer readable media suitable for implementing the subject matter described herein include disk memory devices, chip memory devices, application specific integrated circuits, and programmable logic devices. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein includes methods, systems, and computer readable media for dynamic subscriber profile adaptation. In one exemplary implementation, the subject matter described herein may use a profile adaptation manager co-located with a network node, such as a signal transfer point, a Diameter signaling router (DSR), a Diameter/MAP interworking function, an HLR, an HSS, or an ENUM server and determines whether to modify subscriber information based on the identity of the network requesting the information. Exemplary DSR network elements may include, but are not limited to, a Diameter message router, a Diameter routing agent (DRA), a Diameter relay agent, a Diameter redirect agent, a Diameter translation agent, and a Diameter proxy agent. In mobile communications networks that use the MAP protocol, the profile adaptation manager may intercept insert subscriber data (ISD) messages. In networks that used the Diameter protocol, the profile adaptation manager may intercept user authorization answer (UAA) messages or insert subscriber data request (IDR) messages. In networks that use ENUM, the profile adaptation manager may intercept ENUM responses. If the profile adaptation manager is co-located with the database node, such as the HLR, HSS, or ENUM server, that receives and responds to query messages for subscriber profile information, the profile adaptation manager may determine the set of subscriber profile information to be included in response to a received message based on the identity of the network from which the received message originates.

Call detail records or session detail records may also be generated for the subscriber profile information that is provided. Providing operator control of subscriber profile information may boost the acceptance of ENUM and new technologies to combine database technologies with location information and allow charging access for this information.

Figure 1:
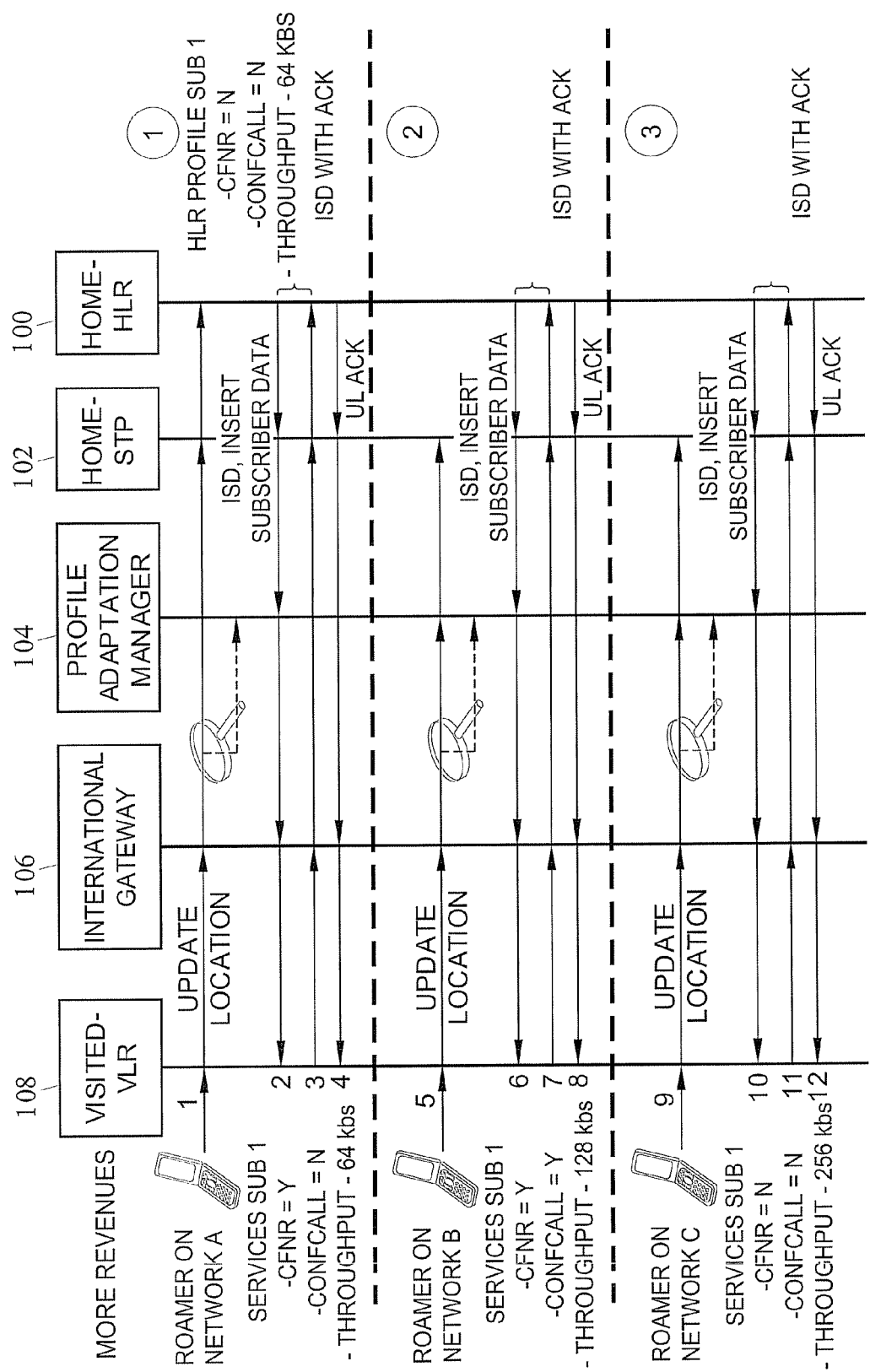
FIG. 1 is a message flow diagram illustrating subscriber profile adaptation in a global system for mobile communications (GSM) network according to an embodiment of the subject matter described herein.

FIG. 1 is a message flow diagram illustrating subscriber profile adaptation for insert subscriber data messages sent from a home location register according to an embodiment of the subject matter described herein.

Referring to FIG. 1, a home location register 100 is a repository of subscriber profile and location data. HLR 100 may be queried by other nodes in the network who are seeking such data. A home signal transfer point 102 routes messages to and from HLR 100.

According to an aspect of the subject matter described herein, a profile adaptation manager 104 may intercept messages from HLR 100 and modify subscriber profile information provided in the messages based on the identity of the requester. An international gateway 106 acts as a gateway between the subscriber's home network and external networks. A visited VLR 108 is the point of contact for a roaming subscriber in a visited network.

Referring to the message flow diagram, in line 1, a subscriber terminal registers with visited VLR 108, and visited VLR 108 sends an update location message to home HLR 100. The update location message contains the subscriber's current location and is used to update the location information stored by HLR 100. In line 2, home HLR 108 responds to the update location message with an insert subscriber data message to provide subscriber profile information to visited VLR 108. Profile adaptation manager 104 may intercept the insert subscriber data message and determine whether or not to modify the message based on the network to which the insert subscriber data message is being sent. For example, the owner/operator of the home network may determine whether to modify the subscriber's profile based on the identity of the owner/operator of the network in which visited VLR 108 operates.

In line 3, the visited VLR 108 responds to the insert subscriber data message with an insert subscriber data acknowledgment message. In line 4, the HLR responds to the insert subscriber data acknowledge with an update location acknowledge message.

Lines 5-8 and 10-12 of the call flow in FIG. 1 contain the same messages as those described above with regard to lines 1-4. However, in these lines, the subscriber is roaming in different networks. Profile adaptation manager 104 may modify the subscriber data in the insert subscriber data messages differently based on the identity of the network where the subscriber is roaming. For example, profile adaptation manager 104 may add to, delete, or modify service information that is included in the ISD message and forward the modified message to the visited network. The determination of the network in which the subscriber is roaming may be made based on the update location message and correlation with the corresponding ISD message or based on the ISD message alone. In other examples, profile adaptation manager 104 may modify mobility management messages corresponding to the ISD messages that carry subscriber profile information in other protocols, most notably Diameter IDR messages.

In the illustrated example, when the subscriber roams in Network A, the subscriber has call forward no reply (CFNR) service, lacks conference calling service, and has a throughput of 64 kbps for data transactions. When the same subscriber is roaming in Network B, the subscriber has CFNR service, conference calling service, and a throughput of 128 kbps. When the subscriber is roaming in Network C, the subscriber lacks CFNR service, lacks conference calling service, and has a throughput of 256 kbps. The complete set of subscriber profile information for the subscriber may include conference calling service, CFNR service, and a standard data rate of 128 kbps. By selectively providing this information to the visited network, the home network operator is able to control services that the subscriber accesses in the visited network and the visibility of services made available to the subscriber by the home network operator.

Figure 2:
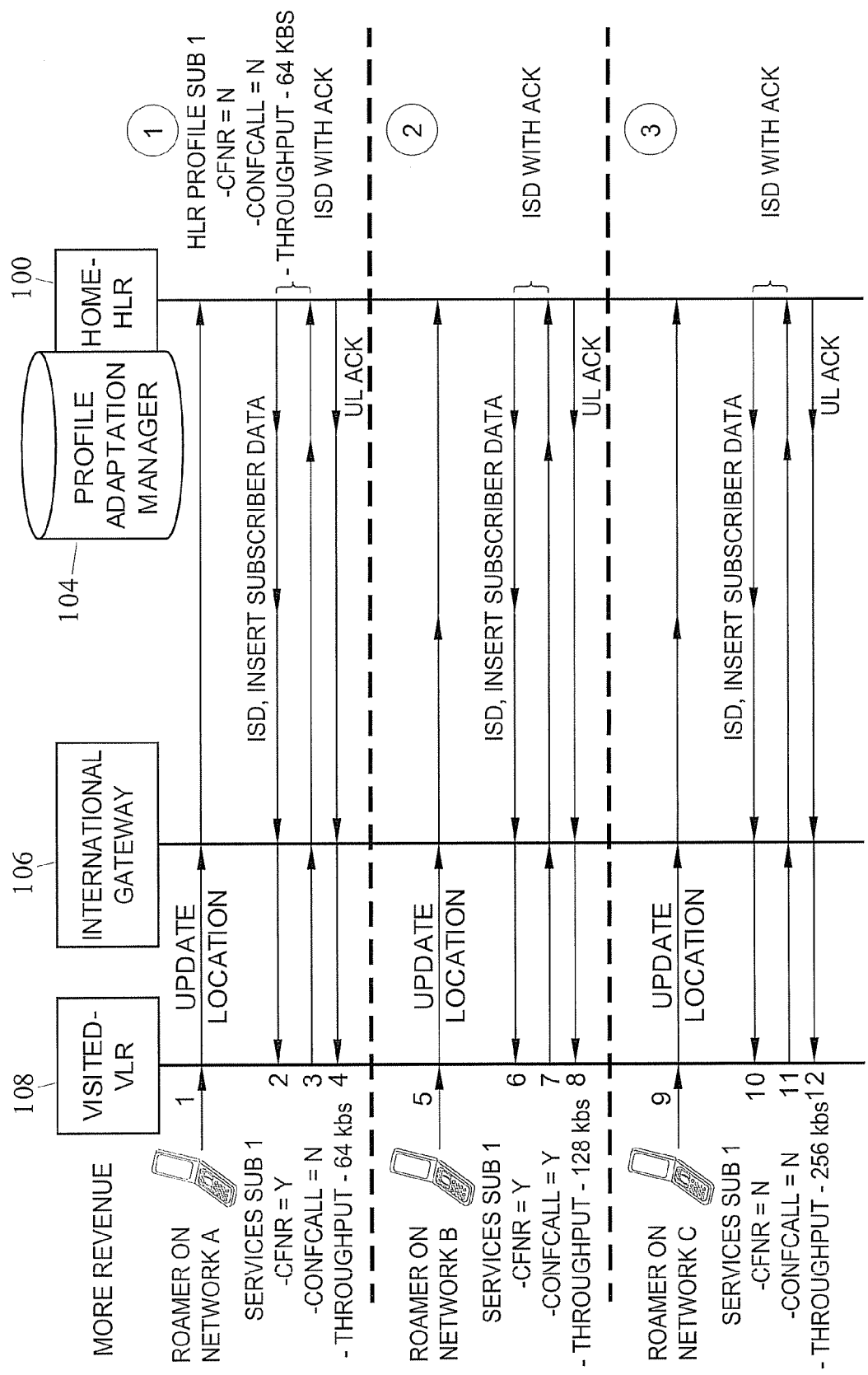
FIG. 2 is a message flow diagram illustrating subscriber profile adaptation in a GSM network wherein the profile adaptation manager is co-located with an HLR according to an embodiment of the subject matter described herein.

In the embodiment illustrated in FIG. 1, profile adaptation manager 104 is a stand-alone node or co-located with an STP. In FIG. 2, profile adaptation manager 104 is co-located with an HLR. Other than the fact that profile adaptation manager 104 is co-located with an HLR, the message flow illustrated in FIG. 2 is the same as that illustrated in FIG. 1. Hence, a description thereof will not be repeated herein. In the embodiment of FIG. 2, profile adaptation manager 104 may receive the incoming update location query requesting subscriber profile information, identify the set of subscriber profile information for the subscriber, and determine whether to add to, modify, or delete subscriber profile information from the set to be included in the response sent to the visited network. The subscriber profile information included in the response could be based at least in part on the identity of the visited network, as described above.

Figure 3:
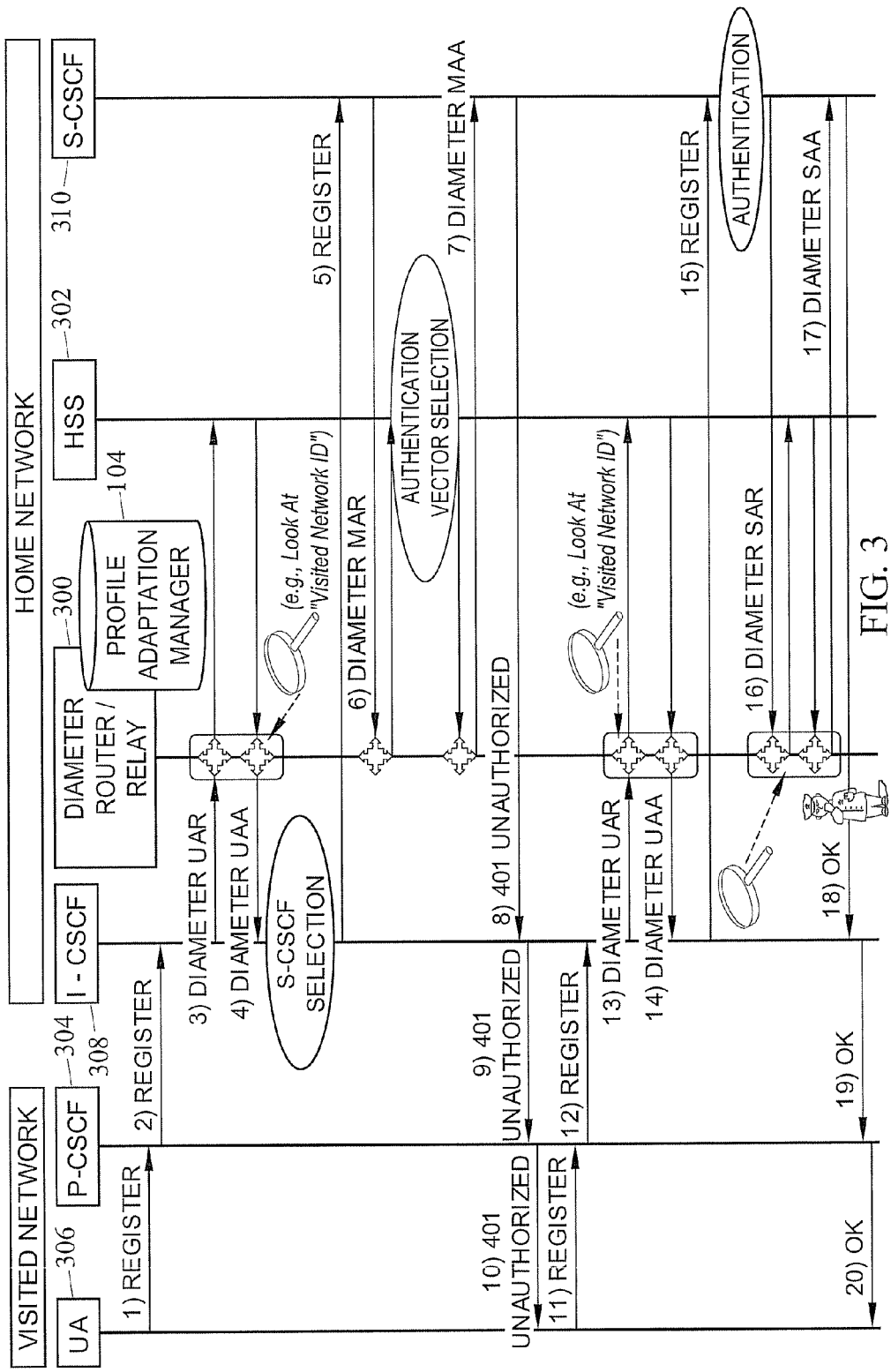
FIG. 3 is a message flow diagram illustrating subscriber profile adaptation in a IP multimedia subsystem (IMS) network according to an embodiment of the subject matter described herein.

In the examples illustrated in FIGS. 1 and 2, the network desiring to control access to the subscriber profile information is an SS7 network (GSM or IS-41) where MAP is used to carry and communicate the subscriber profile information. However, the subject matter described herein is not limited to subscriber profile adaptation in SS7 networks and may, for example, be implemented in a Long Term Evolution (LTE) network or Internet protocol Multimedia Subsystem (IMS) network or any other communications network that employs Diameter-based mobility management signaling. FIG. 3 illustrates an embodiment of the subject matter described herein where profile adaptation manager 104 is a component of a DSR 300 that is a component of an IP multimedia subsystem (IMS) network. In FIG. 3, HSS 302 is the repository for subscriber profile and location information. HSS 302 performs functions in an IMS or other type of network similar to those performed an HLR in IS-41 or GSM networks. Various call session control functions (CSCFs) allow subscribers to access network services. For example, a proxy CSCF (P-CSCF) 304 is the first point of contact by a user agent 306 in a visited network. An interrogating CSCF (I-CSCF) 308 sends messages to HSS 302 for which responses including subscriber profile data are indicated. A serving (S-CSCF) 310 control the set of services provided to a subscriber based on information received from the HSS.

In line 1 of the message flow diagram, UA 306 sends a register message P-CSCF 304. In line 2 of the message flow diagram, P-CSCF 304 sends the register message to I-CSCF 308. In line 3 of the message flow diagram, I-CSCF 308 sends a Diameter user authorization request (UAR) message to HSS 302 via DSR 300. In line 4 of the message flow diagram, HSS 302 responds with a user authorization answer (UAA) message. After receiving the UAA message, I-CSCF selects an S-CSCF to serve the subscriber. In line 5 of the message flow diagram, I-CSCF 308 sends a register message to S-CSCF 310. In line 6, S-CSCF 310 sends a Diameter multimedia authentication request (MAR) message to DSR 300. DSR 300 queries HSS 302 for an authentication vector. In line 7, DSR 300 sends a multimedia authentication answer (MAA) message to S-CSCF 310. In line 8, S-CSCF 310 sends a 401 authorized message to I-CSCF 308. In lines 9 and 10, the 401 unauthorized message is sent to UA 306.

In line 11, UA 306 sends a register message to P-CSCF 304. In line 12, P-CSCF 304 sends the register message to I-CSCF 308. In line 13, I-CSCF 308 sends a diameter UAR message to DSR 300. Profile adaptation manager 104 may determine the visited network ID from the UAR message and store that information for later modification of subscriber profile adaptation information. In line 14, DSR 300 sends a UAA message to I-CSCF 308. In line 15, I-CSCF 308 sends a register message to S-CSCF 310, which authenticates the user.

In line 16, S-CSCF 310 sends a Diameter server assignment request (SAR) message to DSR 300. DSR 300 may query HSS 302 to obtain subscriber profile information. Profile adaptation manager 104 may modify the profile information based on the identity of the visited network as determined from the UAR message in line 3 or line 13 and send a modified set of subscriber profile information to S-CSCF 310 in line 17 of the message flow diagram. In lines 18, 19, and 20, OK messages are communicated from S-CSCF 310 to UA 306

Figure 4:
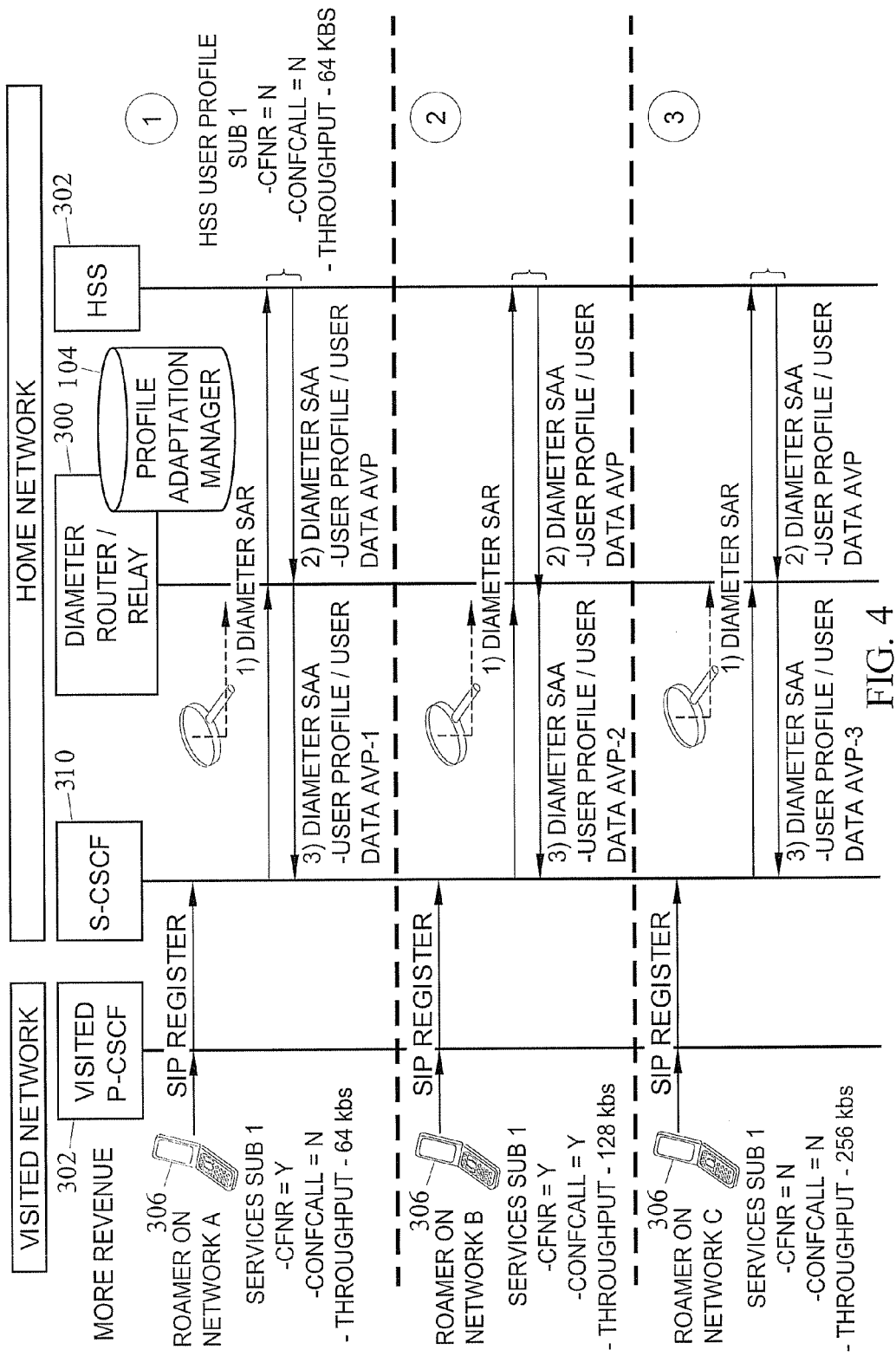
FIG. 4 is a message flow diagram illustrating subscriber profile adaptation in a Diameter network according to an embodiment of the subject matter described herein.

In the example illustrated in FIG. 3, subscriber profile adaptation is performed on a diameter SAA message received from an S-CSCF. In an alternate example, the SAA message from the HSS may be modified. FIG. 4 illustrates such an example. Referring to FIG. 4, profile adaptation manger 104 is a component of DSR 300 as illustrated in FIG. 3. The remaining components are the same as the correspondingly numbered components in FIG. 3. In message flow illustrated in FIG. 4, subscriber terminal 306 roams in network A and generates a SIP register message that is forwarded to S-CSCF 310. In response, S-CSCF 310 sends a diameter SAR in line 1 to HSS 302. In line 2, HSS 302 responds with a Diameter SAA message. The SAA message includes subscriber profile information which profile adaptation manager 104 may intercept, add to, modify, or delete from based on the identity of the visited network. The remaining messages in FIG. 4 illustrate subscriber terminal 306 roaming in different networks. The message flow is the same as the message flow for network A. However, profile adaptation manager 104 may modify the user profile information differently based on the identity of the visited network.

Figure 5:
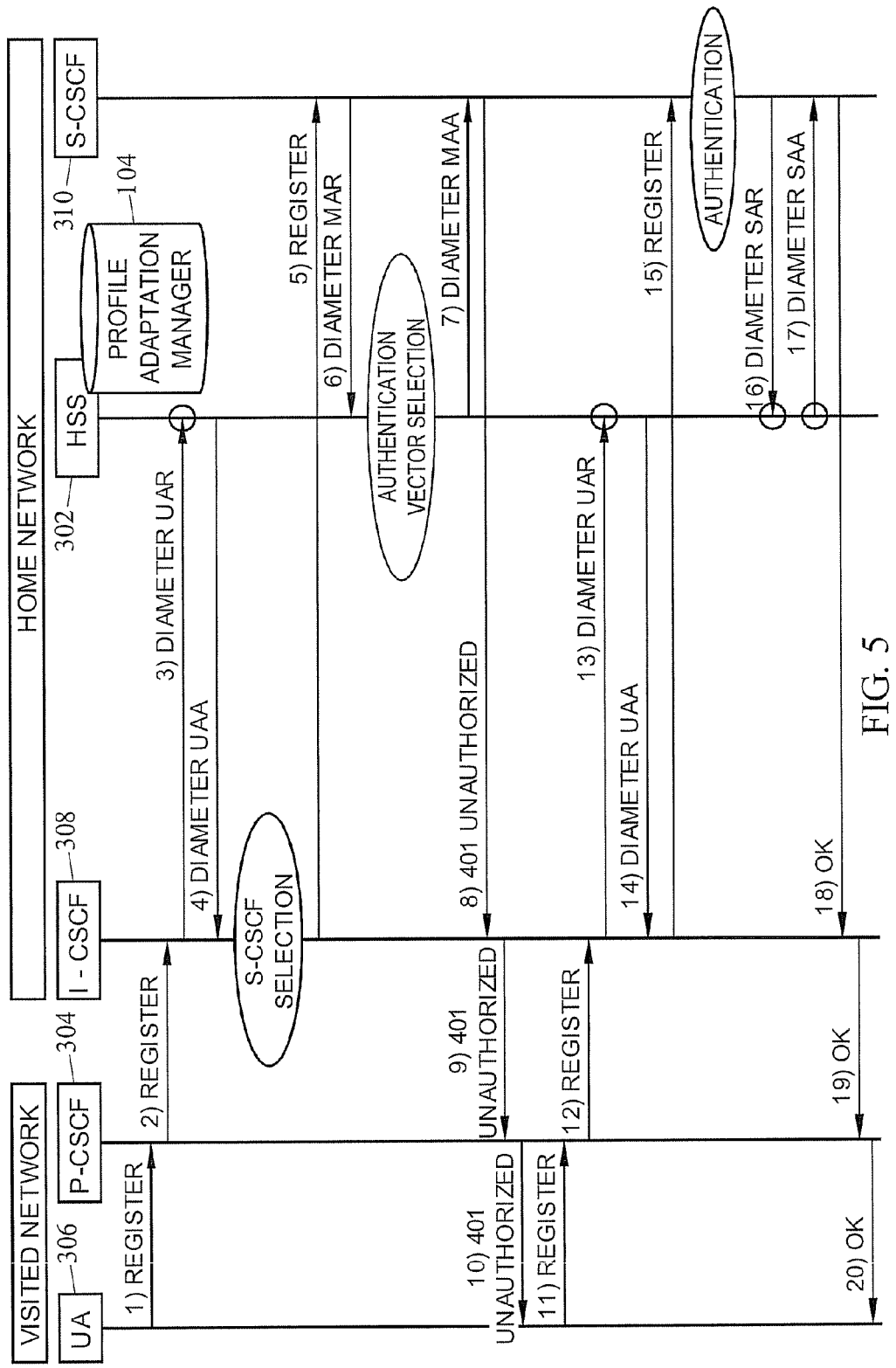
FIG. 5 is a message flow diagram illustrating subscriber profile adaptation in a Diameter network where the profile adaptation manager is co-located with a home subscriber server (HSS) according to an embodiment of the subject matter described herein.

FIG. 5 illustrates an example in a Diameter or IMS network where profile adaptation manager 104 is co-located with HSS 302. In FIG. 5, profile adaptation manager 104 may add to, modify, or delete subscriber profile information provided in the SAA message based on the identity of the visited network as determined by the UAR message.

Referring to the message flow illustrated in FIG. 5, in lines 1 and 2, the register message is communicated from UA 306 to I-CSCF 308. In line 3, I-CSCF 308 sends a Diameter UAR message to HSS 302. Profile adaptation manager 104 may determine the identity of the visited network from the UAR message and may store this information. In line 4, HSS 302 sends a diameter UAA message to I-CSCF 308. In response to UAA message, I-CSCF 308 selects an S-CSCF and sends a register message in line 5 to S-CSCF 310. In line 6, S-CSCF 310 sends a Diameter MAR message to HSS 302. HSS 302 selects an authentication vector in response to a MAR message, and, in line 7, sends a Diameter MAA message including the authentication vectors to S-CSCF 310. In lines 8-10 of the message flow diagram, S-CSCF 310 sends a 401 unauthorized message to UA 306.

In line 11, UA 306 sends a register message to P-CSCF 304, which in line 12, is forwarded to I-CSCF 308. In line 13, I-CSCF 308 sends a diameter UAR message to HSS 302. Profile adaptation manager 104 may determine the identity of the visited network from the UAR message, if such an identity was not determined from the UAR message in line 3. In line 14, HSS 302 sends a diameter UAA message to I-CSCF 308. In line 15, I-CSCF 308 sends a register message to S-CSCF 310, which authenticates the subscriber.

In line 16, S-CSCF 310 sends a Diameter SAR message to HSS 302. Profile adaptation manager 104 may determine whether to modify subscriber profile information provided in response to the SAR message based on the identity of the visited network. In line 17, profile adaptation manager 104 sends the modified SAA message to S-CSCF 310. In lines 18-20, S-CSCF 310 sends an OK message, which reaches subscriber terminal 306.

Figure 6:
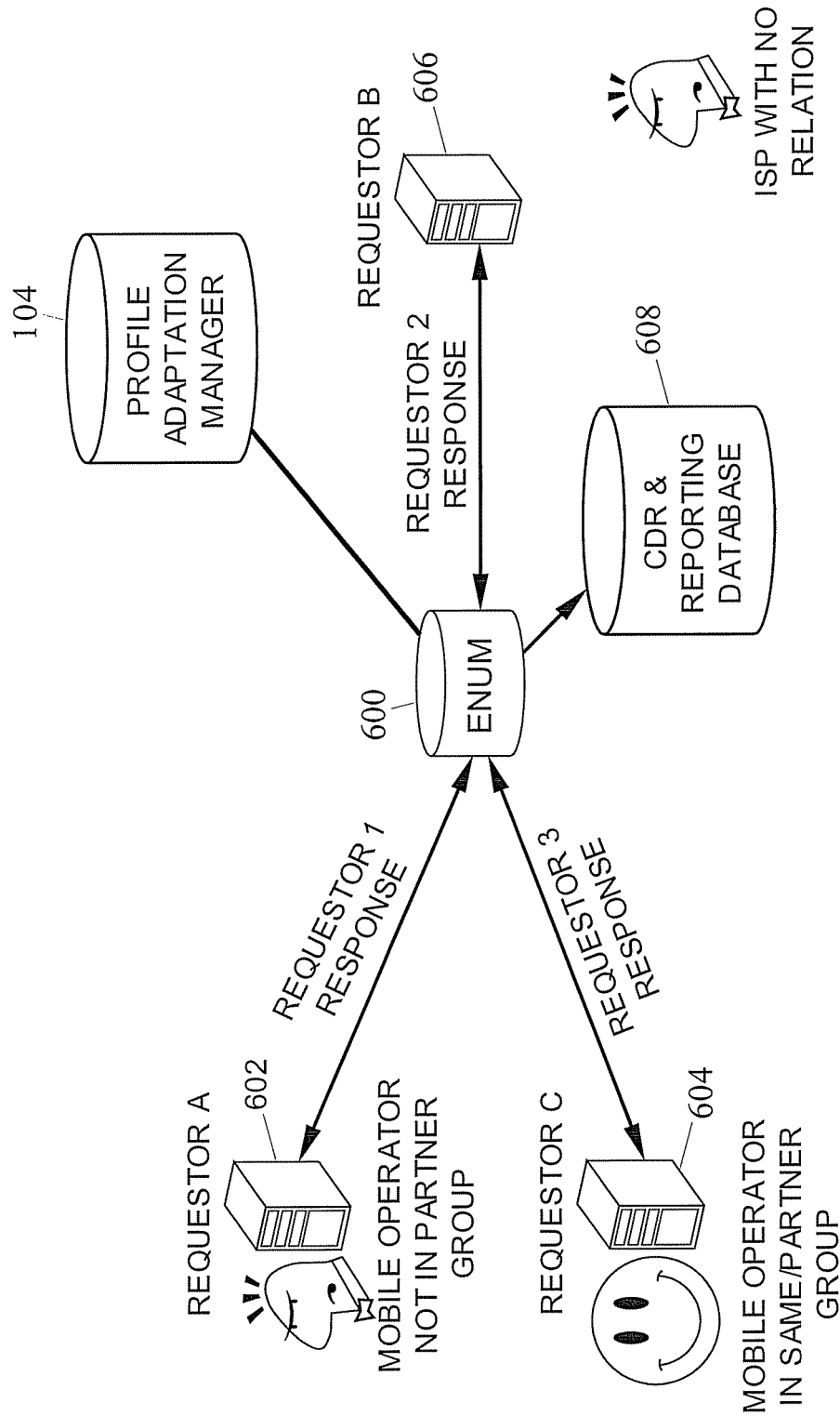
FIG. 6 is a network diagram illustrating a profile adaptation manager that performs subscriber profile adaptation for electronic number mapping (ENUM) queries according to an embodiment of the subject matter described herein.

In the preceding examples, subscriber profile information in HLR or HSS queries is modified. In an alternate implementation of the subject matter described herein, ENUM information provided by an ENUM server may be selectively answered. FIG. 6 is a network diagram illustrating ENUM server with source dependent answering according to an embodiment of the subject matter described herein. Referring to FIG. 6, an ENUM server 600 may perform ENUM translation based on stored ENUM data. For example, ENUM server 600 may translate received telephone numbers, such as E.164 formatted numbers, into domain name system (DNS) identifiers, such as uniform resource identifiers (URIs). ENUM server 600 may be provisioned with subscriber profile information for each ENUM translation record. ENUM server 600 may include profile adaptation manager 104 that determines how to respond to ENUM queries based on the identity of the requester. For example, profile adaptation manager 104 may respond differently (i.e., provide different sets of subscriber profile information for the same subscriber) to ENUM queries based on whether the queries originate from requester 602, 604, or 606. Profile adaptation manager 104 may also store records of ENUM transactions in a CDR or SDR and reporting database 608.

Figure 7:
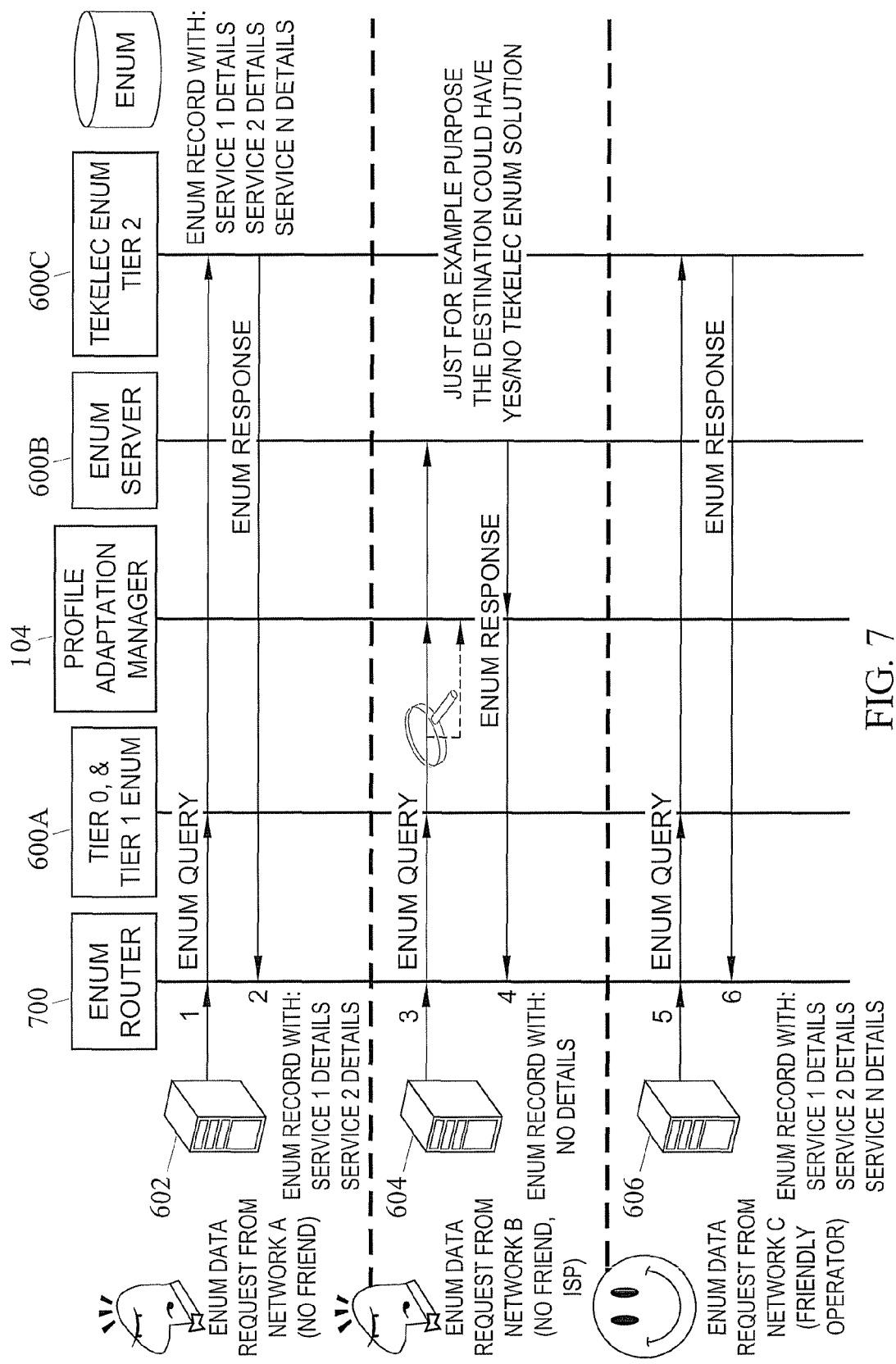
FIG. 7 is a message flow diagram illustrating a profile adaptation manager that performs subscriber profile adaptation for ENUM queries according to an embodiment of the subject matter described herein.

FIG. 7 is a message flow diagram illustrating an embodiment where profile adaptation manager 104 performs ENUM selective answering according to an embodiment of the subject matter described herein. Referring to FIG. 7, a plurality of ENUM servers 600A, 600B, and 600C provide different tiers of ENUM information. Profile adaptation manager 104 may modify ENUM responses from any of these tiers. An ENUM router 700 may route ENUM queries and responses. In the illustrated call message flow, in line 1, requester 602 sends an ENUM query to tier 0 one ENUM server 600A. Tier 0 one ENUM server 600A forwards the message to tier 2 ENUM server 600C. In line 2 of the message flow diagram, tier 2 ENUM server 600C responds to the query with service details in an ENUM record. Profile adaptation manager 104 may intercept the response and add to, omit, or modify the service details.

In lines 3 and 4, requester 604 requests ENUM data from tier 0 ENUM server 600, forwards the information to ENUM server 600B. ENUM server 600B responds to the ENUM query. Profile adaptation manager 104 may modify the ENUM record to contain no subscriber details, as illustrated in line 4.

In lines 5 and 6 of the message flow diagram, requester 606 queries tier 2 ENUM server 600C and receives a response. Profile adaptation manager 104 may pass the response unmodified based on identifying the requester as a friendly network operator. For example, if the originator or requester is a mobile operator who is a partner of the operator of the home network of the subscriber, the ENUM response will be populated with all of the service details. If the ENUM query is not from a partner network, the ENUM response may be provided without the corresponding service details.

As with the above-described embodiments, profile adaptation manager 104 illustrated in FIGS. 6 and 7 can be integrated a network node or may be a stand-alone node. For example, profile adaptation manger 106 may be integrated with an ENUM server or may be on a separate platform, such as an STP, DSR, or other node that intercepts ENUM responses. Profile adaptation manager 104 can modify, add to, or delete subscriber profile information in response to information presented or indicated by fields in the ENUM response.

In an ENUM embodiment, the ENUM server that is configured with profile adaptation manager 104 can share all information with an operator from the same group and/or group of friendly operators. Such an ENUM server can share a reduced set of information with a mobile operator that does not belong to the group or alliance. For example, high-end services can be hidden to avoid subscriber churn. An ENUM server configured with profile adaptation manager 104 can share a minimal amount of information with an ISP with whom it has a relation. Profile adaptation manager 104 can refuse to answer if the requester is unfriendly. Additional functionality that can be implemented by an ENUM based profile adaptation manager 104 includes keeping account of how much information has been provided to a specific source and/or how recent information has been provided to a specific source. Profile adaptation manager 104 may also generate CDRs or SDRs for billing or other network management purposes.

Figure 8:
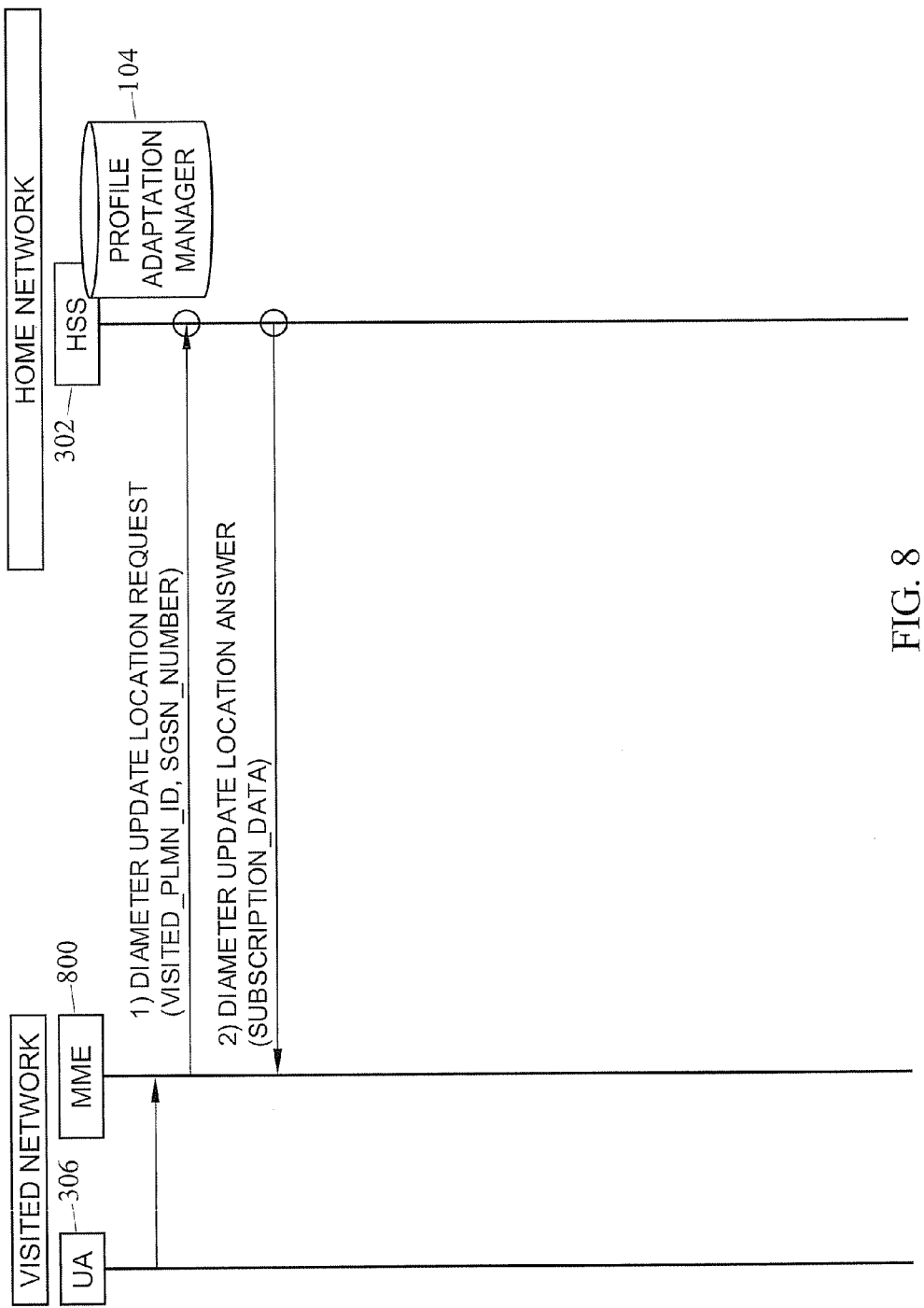
FIG. 8 is a message flow diagram illustrating subscriber profile adaptation in a long term evolution (LTE) network according to an embodiment of the subject matter described herein.
Figure 9:
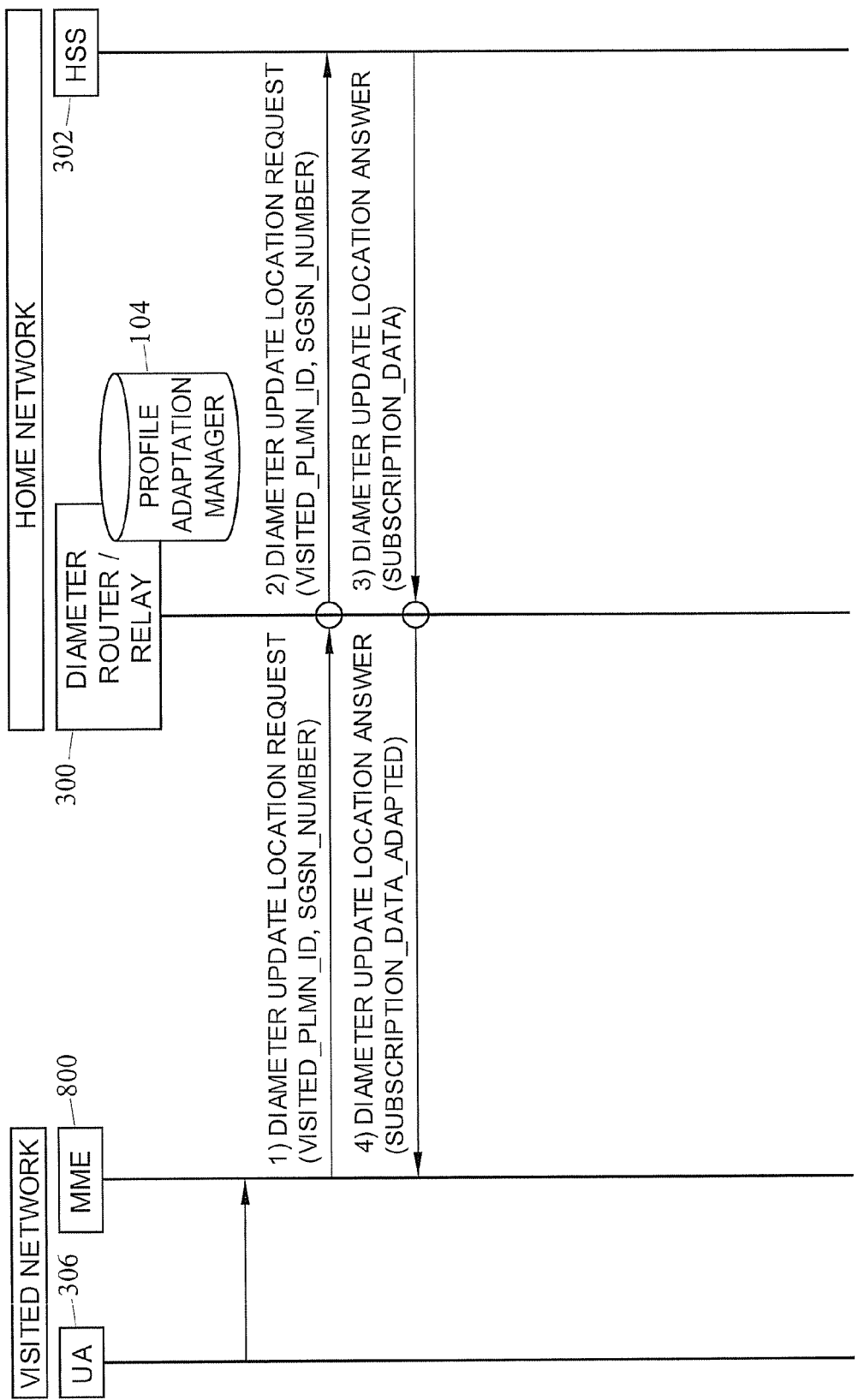
FIG. 9 is a message flow diagram illustrating subscriber profile adaptation in a long term evolution (LTE) network according to an embodiment of the subject matter described herein.

In the examples illustrated above, profile adaptation manager 104 operates in MAP-based, IMS, and ENUM environments. In an alternate example, profile adaptation manager 104 may operate in a long term evolution (LTE) network to adapt subscriber profile information based on the identity of the visited public land mobile network for serving gateway support node. FIGS. 8 and 9 illustrate such an embodiment. In FIG. 8, profile adaptation manager 104 is a component of HSS 302. In FIG. 9, profile adaptation manager 104 is a component of DSR 300. However, rather than residing on an IMS network as described above, DSR 300 and HSS 302 reside at an LTE network. In the LTE network illustrated in FIGS. 8 and 9, a user agent 306 is roaming and is served by mobility management entity 800.

Referring to the message flow diagram illustrated in FIG. 8, in line 1, when UA 306 first contacts the visited network or moves to a new area in the visited network, MME 700 sends a Diameter update location request (ULR) including the visited PLMN ID and SGSN number to HSS 302 in the home network. Profile adaptation manager 104 may modify the response sent to the visited network based on the identity of the visited network, as determined by the visited PLMNID and/or the SGSN number. In line 2, profile adaptation manager 104 sends a modified Diameter update location answer (ULA) message with the subscription data to MME 800.

In FIG. 9, the message flow is the same as that illustrated in FIG. 8 except that profile adaptation manager 104 intercepts the Diameter update location answer message sent from HSS 302 to MME 800 and modifies the subscriber information in the message based on the identity of the visited network. As with the example illustrated in FIG. 8, the visited network may be identified by the PLMN ID and/or the SGSN number. The visited network can be identified by correlating the Diameter update location request and the corresponding answer or based on the answer alone. Modifying the subscriber profile information can include adding to, deleting from, or modifying the fields of the ULA message.

In the example illustrated in FIG. 9, profile adaptation manager 104 intercepts and modifies the Diameter update location answer message. In an alternate example, HSS 302 may provide a Diameter insert subscriber data request (IDR) message in response to the ULR message before sending the update location answer message. The IDR request message may include subscriber profile information. In such an embodiment, profile adaptation manager 104 may intercept the IDR message, determine whether to modify the subscriber profile information in the IDR message based on the identity of the visited network, make the corresponding modifications to the subscriber profile information, and forward the modified message to the visited network.

Figure 10:
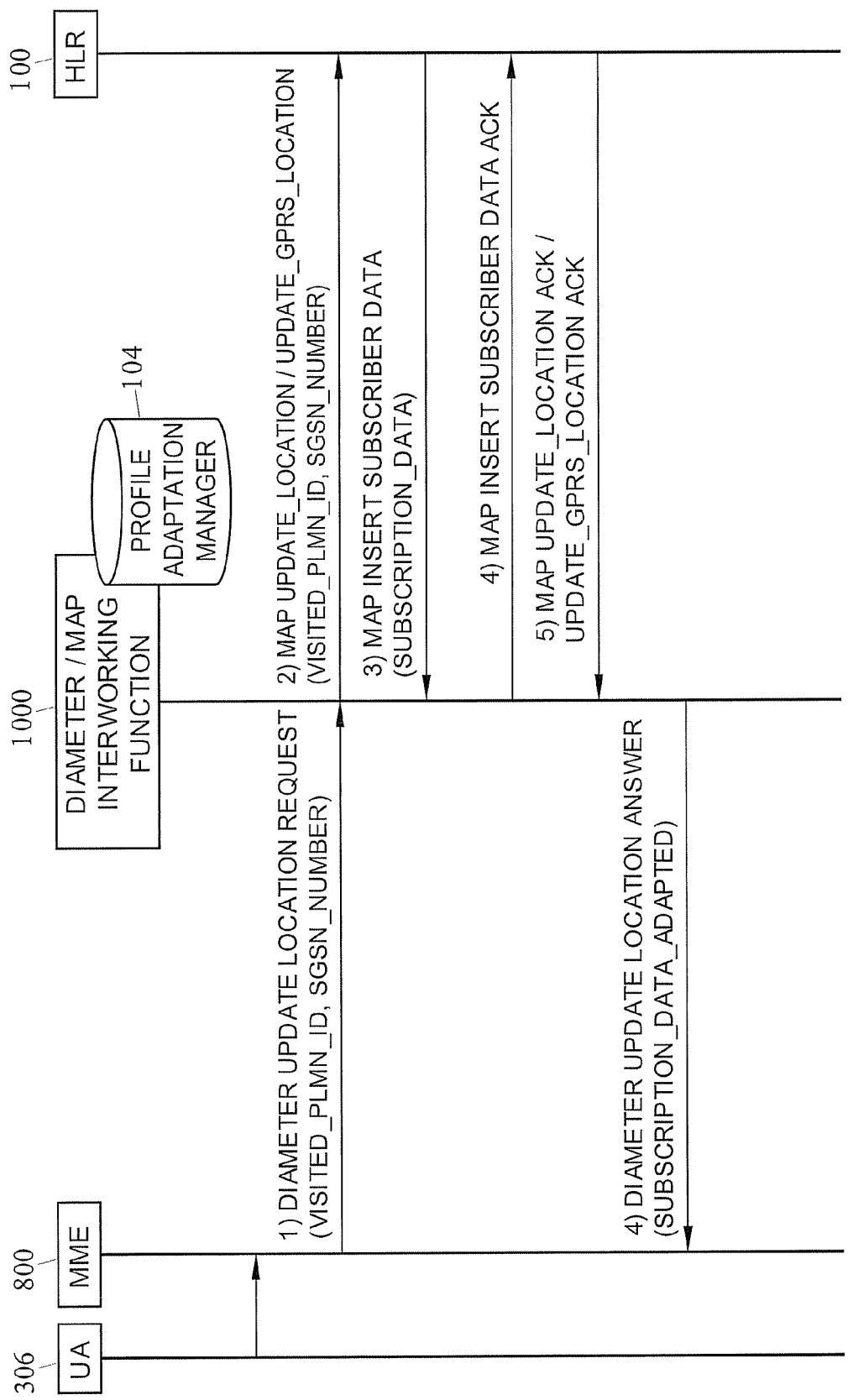
FIG. 10 is a message flow diagram illustrating subscriber profile adaptation at a Diameter/mobile application part (MAP) interworking function where the subscriber is a GSM or interim standard 41 (IS-41) subscriber roaming in an LTE network according to an embodiment of the subject matter described herein.
Figure 11:
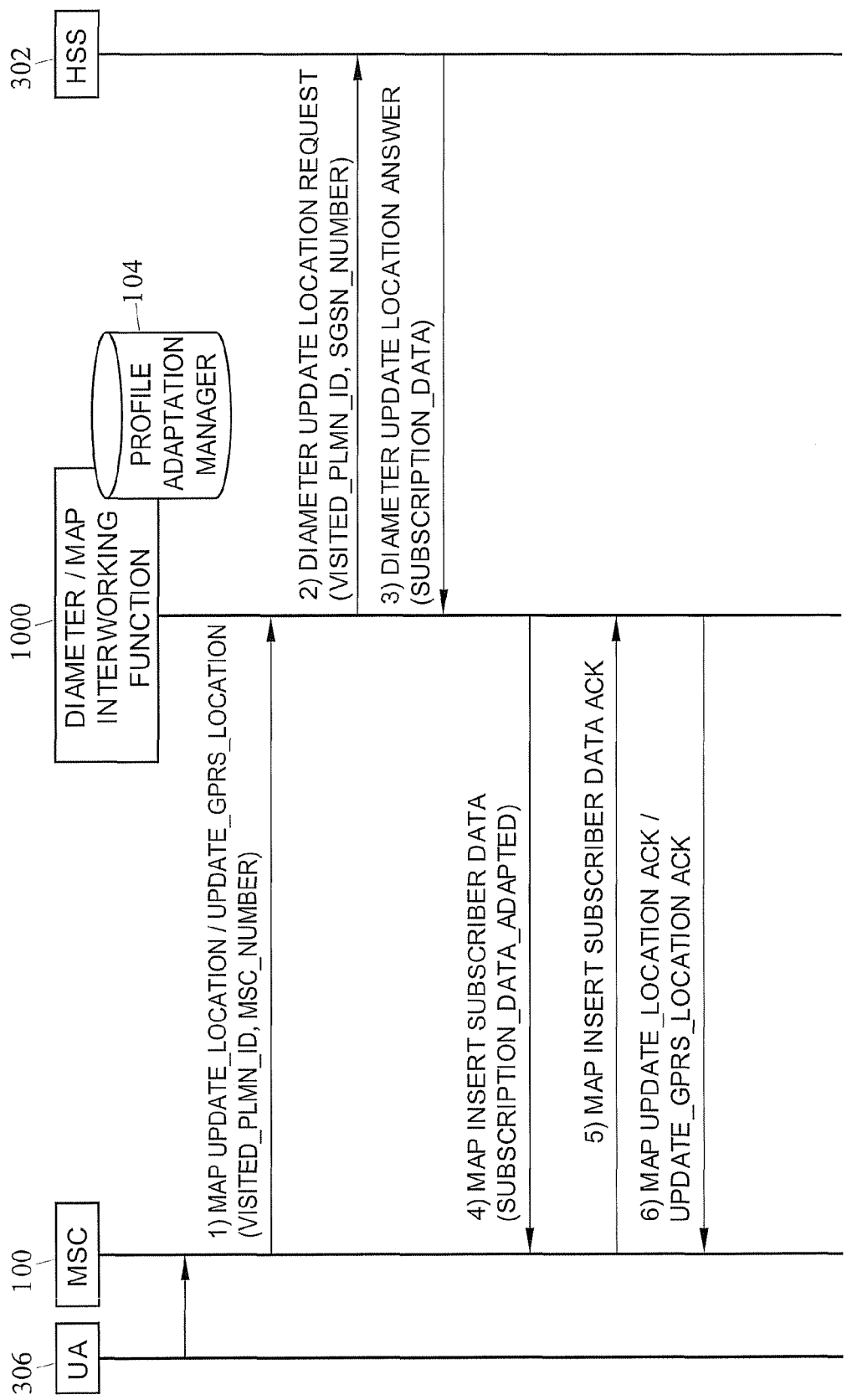
FIG. 11 is a message flow diagram illustrating subscriber profile adaptation at a Diameter/MAP interworking function where the subscriber is an LTE subscriber roaming in an IS-41 or GSM network according to an embodiment of the subject matter described herein.

In the preceding examples, profile adaptation manager 104 is integrated with various routing or database nodes. In FIGS. 10 and 11, profile adaptation manager 104 is integrated with a Diameter/MAP interworking function as described in 3GPP TS 29.305 V9.0.0 (2009-12), the disclosure of which is incorporated herein by reference in its entirety. A Diameter/MAP interworking function 1000 as illustrated in FIGS. 10 and 11 may translate between the Diameter and MAP protocols to facilitate interworking between Diameter-based networks and legacy networks, such as GSM or IS-41 networks, that use MAP. It should be noted that a diameter/map interworking function need not be compliant with the above-referenced 3GPP standard to be within the scope of the subject matter and claimed herein.

In the example call flow in FIG. 10, when UA 306 first contacts the LTE network, MME 800, in line 1, sends a Diameter update location request message to Diameter/MAP interworking function 1000. Diameter/MAP interworking function 1000 may generate and send a corresponding MAP update location message to HLR 100. HLR 100 may send a MAP insert subscriber data message with subscriber profile information to interworking function 1000. In line 4, Diameter/MAP interworking function 1000 acknowledges the insert subscriber data message. In line 5, HLR 100 sends an insert subscriber data message to interworking function 1000. Profile adaptation manager 104 may modify the subscriber profile information that is included in the insert subscriber data message, generate a Diameter update location answer message including the modified information and forward the ULA message to MME 800. The information may be modified based on the visited PLMN ID and/or the SGSN number as determined from the received Diameter update location request message. In the alternative, profile adaptation manager 104 may generate a Diameter IDR message with the modified set of subscriber profile information and send the IDR message to the visited network.

In FIG. 11, profile adaptation manager 104 modifies or determines whether to modify the subscription information that is presented to a visited network where the visited network is the MAP or GSM network rather than the LTE network. Referring to FIG. 11, in line 1, in response to UA 306 registering in the visited network, MSC 100 sends a MAP update location message to diameter/map interworking function 1000. In line 2, Diameter/MAP interworking function 1000 sends a Diameter location update request to HSS 302. HSS 302 sends, in line 3, a Diameter update location answer message with the subscription data to Diameter/MAP interworking function 1000. Profile adaptation manager 104 may modify the subscription data provided to the visited network based on the identity of the visited network determined from the visited PLMN ID and/or the MSC number. In line 4, profile adaptation manager 104 sends a modified MAP insert subscriber data message to MSC 100. In line 5, MSC 100 acknowledges the insert subscriber data message. In line 6, Diameter/MAP interworking function sends a MAP update location acknowledgement message to MSC 100.

Figure 12:
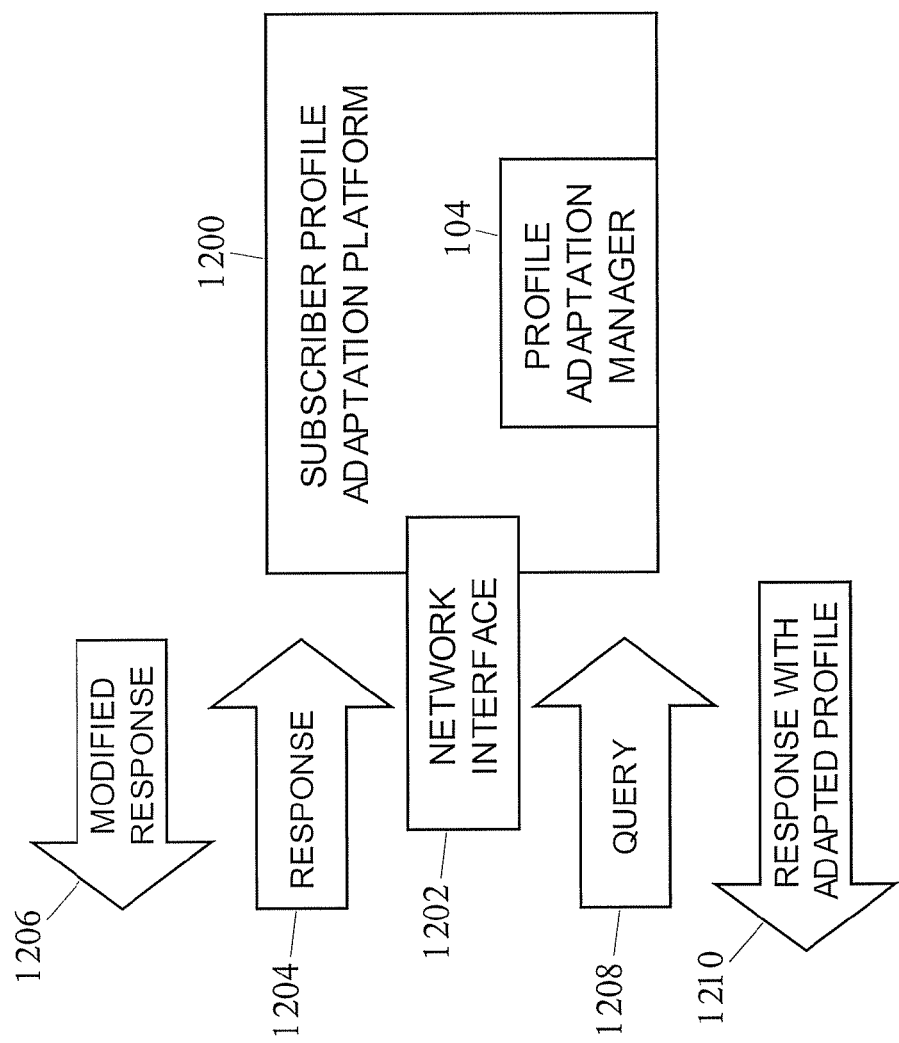
FIG. 12 is a block diagram illustrating an exemplary subscriber profile adaptation platform according to an embodiment of the subject matter described herein.

FIG. 12 illustrates an exemplary subscriber profile adaptation platform including a subscriber profile adaptation manager 104 according to an embodiment of the subject matter described herein. FIG. 12 illustrates an example of profile adaptation manger platform that can be used to intercept HLR, HSS or ENUM responses containing subscriber information, to modify that information, and to forward the modified messages to the querying network. Alternatively, the profile adaptation platform may respond to received messages with the appropriate service subscriber profile information, if the subscriber profile adaptation platform is integrated with the database platform, such as an HLR, an HSS, or an ENUM server, that stores the subscriber profile information. In the illustrated example, profile adaptation platform 1200 includes a network interface for receiving queries and/or responses relating to or containing subscriber profile information. Profile adaptation manager 104 performs the operations described above regarding intercepting and modifying responses or responding to queries. Arrows 1204 and 1206 illustrate the case where profile adaptation platform 1200 intercepts or receives a response, modifies the response, and the forwards the modified response to the querying network. Arrows 1208 and 1210 illustrate the case where profile adaptation platform 1200 receives a message and responds to the message with the adapted profile. Profile adaptation platform 1200 can include a processor and associated memory with profile adaptation manager 104 being embodied in a non-transitory computer readable medium, such as the memory, and including computer executable instructions executable by the processor for controlling profile adaptation platform 1200 to perform the steps described herein for subscriber profile adaptation.

Figure 13:
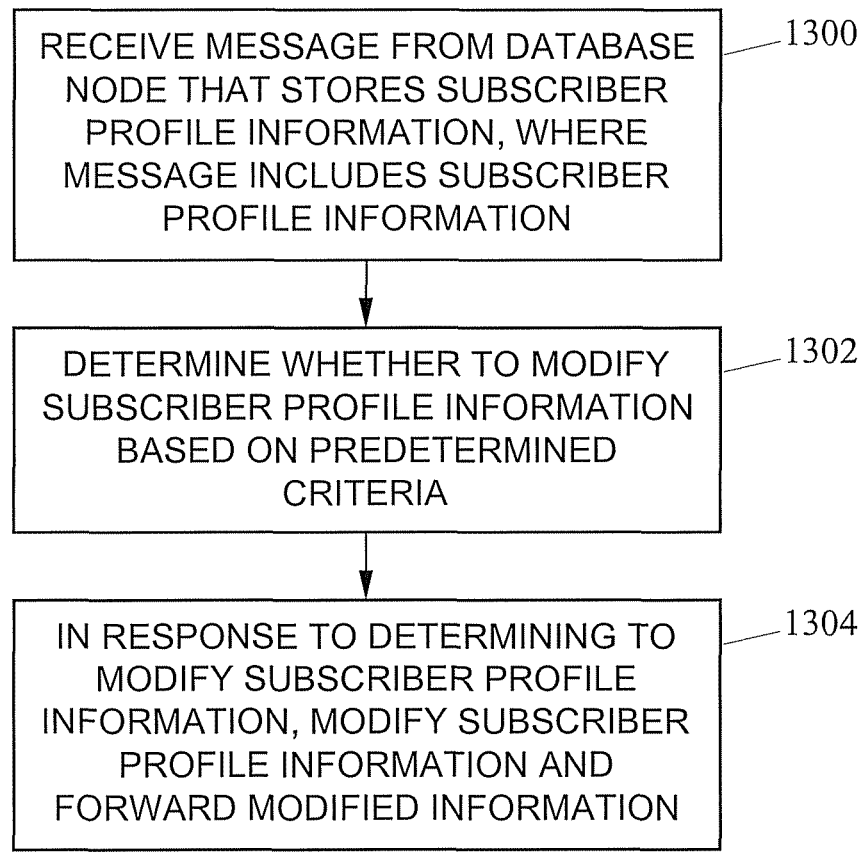
FIG. 13 is a flow chart illustrating exemplary steps for dynamic subscriber profile adaptation based on a received response message according to an embodiment of the subject matter described herein.

FIG. 13 is a flow chart illustrating exemplary steps for dynamic subscriber profile adaptation according to an embodiment of the subject matter described herein. The steps illustrated in FIG. 13 may be performed by profile adaptation manager 104 configured to operate as illustrated in any of the embodiments described herein. Referring to FIG. 13, in step 1300, a message generated by a database node in response to a message received by the database node is received. The received message includes subscriber profile information. For example, profile adaptation manager 104 may receive a message from a database node separate from or co-located with profile adaptation manager 104, where the response includes details about the subscriber's service profile. In step 1302, it is determined whether to modify the subscriber profile information based on predetermined criteria. For example, profile adaptation manager 104 may determine whether to add to, delete from, or change the subscriber profile information in the generated message based on the identity of the network to which the response is destined. In step 1304, in response to determining to modify the subscriber profile information, the subscriber profile information is modified, and the modified subscriber profile information is forwarded to an originator of the message generated by the database node. For example, profile adaptation manager 104 may add to, delete from, or change the subscriber profile information in the modified message based on the identity of the requester.

Figure 14:
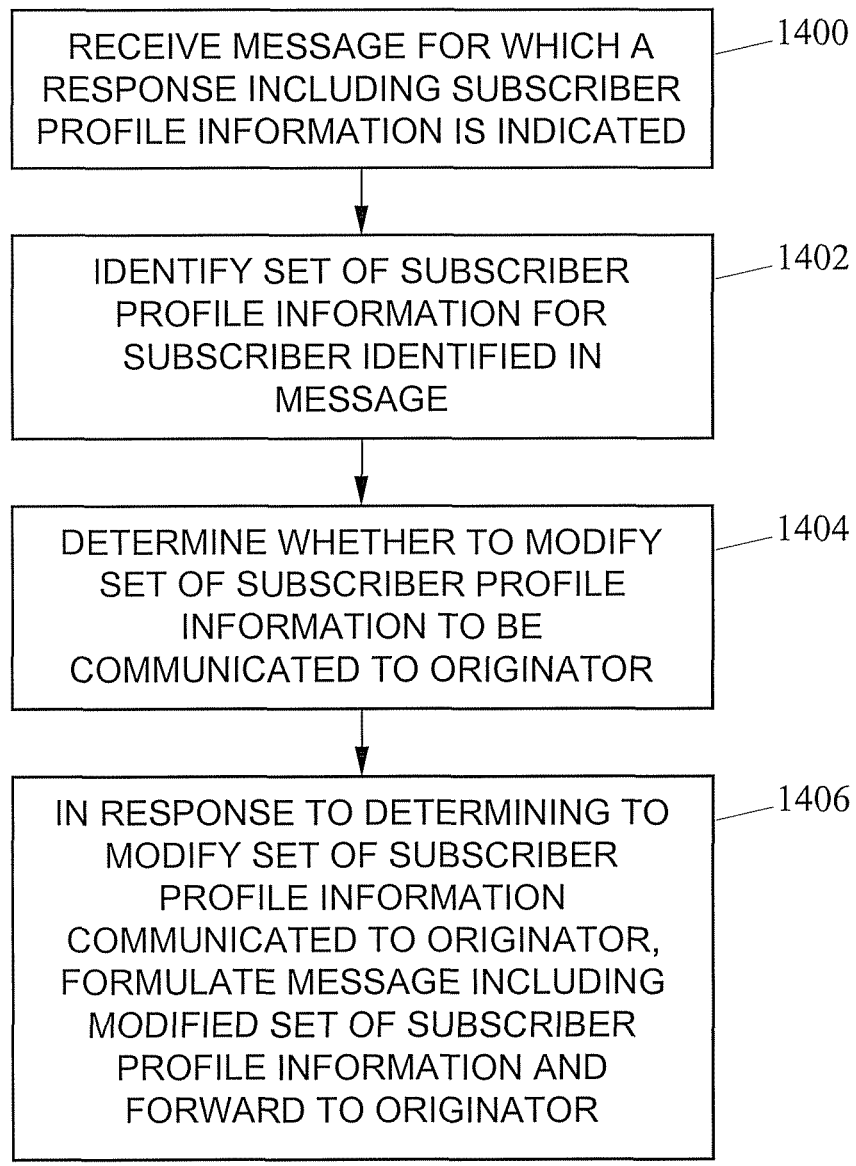
FIG. 14 is a flow chart illustrating exemplary steps for dynamic subscriber profile information based on a received query message according to an embodiment of the subject matter described herein.

As set forth above, if profile adaptation manager 104 is co-located with a database node, such as an HLR, an HSS, or an ENUM server that receives messages and provides subscriber profile information, profile adaptation manager 104 may determine the set of subscriber information to include in the responsive messages (rather than intercepting response message generated by the database node and modifying the subscriber information in the generated message). FIG. 14 is a message flow diagram illustrating exemplary steps for subscriber profile adaptation where profile adaptation manager 104 resides at a database node and determines the set of subscriber profile information to include in a responsive message according to an embodiment of the subject matter described herein. Referring to FIG. 14, in step 1400, a message is received by a subscriber profile adaptation manager 104 co-located with a database node. For example, profile adaptation manger 104 co-located with an HLR, an HSS, or an ENUM server may receive a MAP update location message, a Diameter update location request message, a Diameter IDR message, or an ENUM query. In step 1402, a set of subscriber profile information provisioned for the subscriber to which the received message pertains is identified. For example, profile adaptation manager 104 and/or the underlying HLR, HSS, or ENUM server may determine the complete set of subscriber profile information provisioned for a subscriber by performing a lookup in a subscriber profile database using a subscriber identifier, such as an international mobile station identifier (IMSI), contained in the received message. In step 1404, it is determined whether to modify the set of subscriber profile information for inclusion in a message generated in response to the message received by the database node based on predetermined criteria. For example, profile adaptation manager 104 may determine whether to add to, delete from, or change items from the set of subscriber profile information for inclusion in the generated message based on the identity of the network from which the request originated. In step 1406, in response to determining to modify the set of subscriber profile information for inclusion in the generated message, the set subscriber profile information to be included in the generated message is modified and the response is forwarded to an originator of the received message. For example, profile adaptation manager 104 may add to, delete from, or change the set of subscriber information to be included in the ISD message, UAR message, ULA message, IDR message, ENUM response, or other message based on the identity of the network that originated the query.

It will be understood that various details of the subject matter described herein may be changed without departing from the scope of the subject matter described herein. Furthermore, the foregoing description is for the purpose of illustration only, and not for the purpose of limitation.

What is claimed is:
1. A method for subscriber profile adaptation, the method comprising:

receiving, from a database node that stores subscriber profile information, a message generated by the database node in response to a message received by the database node, wherein the message generated by the database node includes subscriber profile information;

determining whether to modify the subscriber profile information based on predetermined criteria; and in response to determining to modify the subscriber profile information, modifying the subscriber profile information and forwarding the modified subscriber profile information to an originator of the message received by the database node, wherein modifying the subscriber profile information includes using originating network identification information to determine how to modify the subscriber profile information and wherein using the originating network identification information to determine how to modify the subscriber profile information includes determining whether to add to, change, or delete some or all of the subscriber profile information provided to the originator of the message received by the database node based on an identity of a network in which a subscriber is roaming.

2. The method of claim 1 wherein the database node comprises one of a home location register (HLR), a home subscriber server (HSS), and an electronic number mapping (ENUM) server.

3. The method of claim 1 wherein determining whether to modify the subscriber profile information provided to the originator of the message generated by the database node includes using originating network identification information to determine whether to modify the subscriber profile information.

4. The method of claim 1 comprising modifying subscriber profile information differently when the subscriber is roaming in different networks.

5. The method of claim 1 wherein the message generated by the database node comprises one of an electronic number mapping (ENUM) response, a Diameter message, and a mobile application part (MAP) message relating to a roaming subscriber.

6. The method of claim 1 wherein the steps are performed by a profile adaptation manager configured to operate as a stand-alone network node.

7. The method of claim 1 wherein the steps are performed by a profile adaptation manager co-located with a network node.

8. The method of claim 7 wherein the network node comprises a signal transfer point (STP), a Diameter signaling router (DSR), or a mobile application part (MAP)/Diameter interworking function.

9. The method of claim 1 wherein the steps are performed by a profile adaptation manager configured to operate in at least one of an SS7 network, an IP multimedia subsystem (IMS) network, and a long term evolution (LTE) network.

10. The method of claim 1 comprising generating a call or session detail record based on the modified subscriber profile information.

11. A method for subscriber profile adaptation, the method comprising:

receiving, at a database node that stores subscriber profile information, a message for which a response including subscriber profile information for a particular subscriber is indicated;

identifying a set of subscriber profile information provisioned for the subscriber to which the received message pertains;

determining, based on predetermined criteria, whether a set of subscriber profile information for inclusion in a message generated by the database node in response to the received message should be modified relative to the set of subscriber profile information provisioned for the subscriber in database node; and in response to determining to modify the set of subscriber profile information for inclusion in the generated message, modifying the set of subscriber profile information to be included in the generated message relative to the set of subscriber profile information provisioned for the subscriber in the database node and forwarding the generated message to an originator of the received message, wherein modifying the set of subscriber profile information for inclusion in the generated message includes using originating network identification information to determine how to modify the set of subscriber profile information for inclusion in the generated message and wherein using the originating network identification information to determine how to modify the set of subscriber profile information for inclusion in the generated message includes determining whether to add to, change, or delete some or all of the subscriber profile information provided to the originator of the message received by the database node based on an identity of a network in which a subscriber is roaming.

12. A system for subscriber profile adaptation, the system comprising:
a network interface for receiving, from a database node that stores subscriber profile information, a message generated by the database node in response to a message received by the database node, wherein the message generated by the database node includes subscriber profile information;
a profile adaptation manager for determining whether to modify the subscriber profile information based on predetermined criteria, for, in response to determining to modify the subscriber profile information, modifying the subscriber profile information, and for forwarding the modified subscriber profile information to an originator of the message received by the database node, wherein modifying the subscriber information includes using originating network identification information to determine how to modify the subscriber profile information and wherein using the originating network identification information to determine how to modify the subscriber profile information includes determining whether to add to, change, or delete some or all of the subscriber profile information provided to the originator of the message received by the database node based on an identity of a network in which a subscriber is roaming.

13. The system of claim 12 wherein the database node comprises one of a home location register (HLR), a home subscriber server (HSS), and an electronic number mapping (ENUM) server.

14. The system of claim 12 wherein determining whether to modify the subscriber profile information in the generated message includes using originating network identification information to determine whether to modify the subscriber profile information.

15. The system of claim 12 wherein the profile adaptation manager is configured to modify the subscriber profile information differently when the subscriber is roaming in different networks.

16. The system of claim 12 wherein the generated message comprises one of an electronic number mapping (ENUM) response, a Diameter message, and a mobile application part (MAP) message relating to a roaming subscriber.

17. The system of claim 12 wherein the profile adaptation manager and the network interface are configured to operate as a stand-alone network node.

18. The system of claim 12 wherein profile adaptation manager and the network interface are components of a signal transfer point (STP), a Diameter signaling router (DSR), or a mobile application part (MAP)/Diameter interworking function.

19. The system of claim 12 wherein the profile adaptation manager is configured to operate in at least one of an SS7 network, an IP multimedia subsystem (IMS) network, and a long term evolution (LTE) network.

20. The system of claim 12 wherein the profile adaptation manager is configured to generate a call or session detail record based on the modified subscriber profile information.

21. A subscriber profile adaptation platform comprising:
a database for storing subscriber information;
a network interface for receiving a message for which a response including subscriber profile information for a particular subscriber is indicated; and
a profile adaptation manager for identifying a set of subscriber profile information provisioned in the database for the subscriber to which the received message pertains, for determining, based on predetermined criteria, whether a set of subscriber profile information for inclusion in a message generated in response to the query should be modified relative to the set of subscriber profile information provisioned for the subscriber in the database, and for, in response to determining to modify the set of subscriber profile information to be included in the generated message, modifying the set of subscriber profile information for inclusion in the generated message relative to the set of information provisioned for the subscriber in the database and forwarding the generated message, wherein modifying the set of subscriber profile information for inclusion in the generated message includes using originating network identification information to determine how to modify the set of subscriber profile information for inclusion in the generated message and wherein using the originating network identification information to determine how to modify the set of subscriber profile information for inclusion in the generated message includes determining whether to add to, change, or delete some or all of the subscriber profile information provided to the originator of the message received by the database node based on an identity of a network in which a subscriber is roaming.

22. A non-transitory computer readable medium having stored thereon executable instructions that when executed by the processor of a computer control the computer to perform steps comprising:
receiving, from a database node that stores subscriber profile information, a message generated by the database node in response to a message received by the database node, wherein the message generated by the database node includes subscriber profile information;
determining whether to modify the subscriber profile information based on predetermined criteria; and
in response to determining to modify the subscriber profile information, modifying the subscriber profile information and forwarding the modified subscriber profile information to an originator of the message received by the database node, wherein modifying the subscriber information includes using originating network identification information to determine how to modify the subscriber profile information and wherein using the originating network identification information to determine how to modify the subscriber profile information includes determining whether to add to, change, or delete some or all of the subscriber profile information provided to the originator of the message received by the database node based on an identity of a network in which a subscriber is roaming.

23. A non-transitory computer readable medium having stored thereon executable instructions that when executed by the processor of a computer control the computer to perform steps comprising:

receiving, at a database node that stores subscriber profile information, a message for which a response including subscriber profile information for a particular subscriber is indicated;

identifying a set of subscriber profile information provisioned for the subscriber to which the received message pertains;

determining, based on predetermined criteria, whether a set of subscriber profile information for inclusion in a message generated by the database node in response to the received message should be modified relative to the set of subscriber profile information provisioned for the subscriber in database node; and in response to determining to modify the set of subscriber profile information for inclusion in the generated message, modifying the set of subscriber profile information to be included in the generated message relative to the set of subscriber profile information provisioned for the subscriber in the database node and forwarding the generated message to an originator of the received message, wherein modifying the set of subscriber profile information for inclusion in the generated message includes using originating network identification information to determine how to modify the set of subscriber profile information for inclusion in the generated message and wherein using the originating network identification information to determine how to modify the set of subscriber profile information for inclusion in the generated message includes determining whether to add to, change, or delete some or all of the subscriber profile information provided to the originator of the message received by the database node based on an identity of a network in which a subscriber is roaming.

\* \* \* \* \*